(No Model.)

C. L'EPLATTENIER.
BICYCLE.

No. 438,684. Patented Oct. 21, 1890.

Witnesses
Anton Fougner
Amara Orclup

Inventor
Charles L'Eplattenier
By his Attorney W. Zimmerman

UNITED STATES PATENT OFFICE.

CHARLES L'EPLATTENIER, OF CHICAGO, ILLINOIS.

BICYCLE.

SPECIFICATION forming part of Letters Patent No. 438,684, dated October 21, 1890.

Application filed July 29, 1890. Serial No. 360,278. (No model.)

*To all whom it may concern:*

Be it known that I, CHARLES L'EPLATTENIER, a citizen of the United States, residing at Chicago, in the county of Cook and State of Illinois, have invented certain new and useful Improvements in Bicycles, which are fully set forth in the following specification, reference being had to the accompanying drawings, forming a part thereof, and in which—

Figure 1:
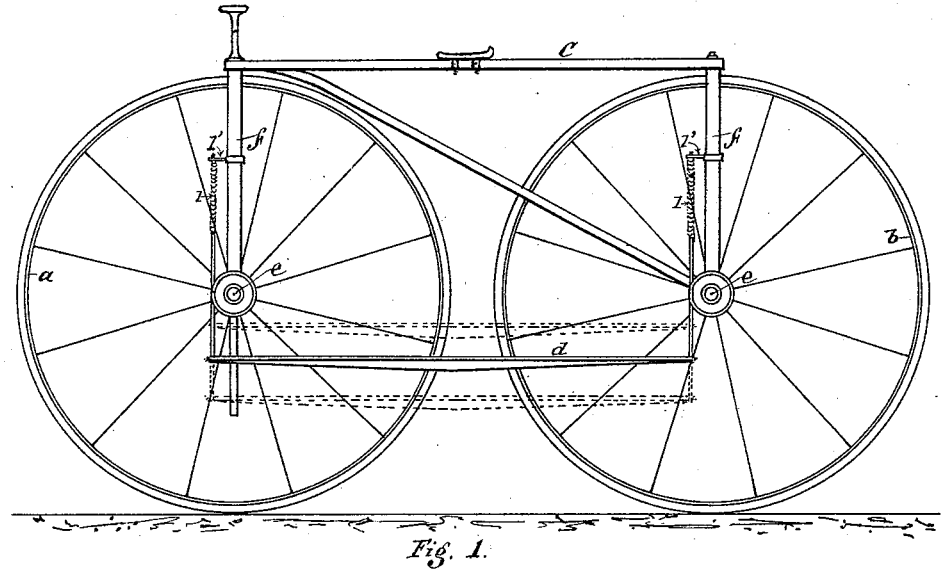
Figure 2:
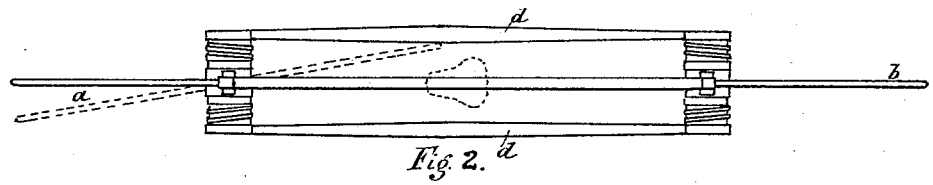
Figure 3:
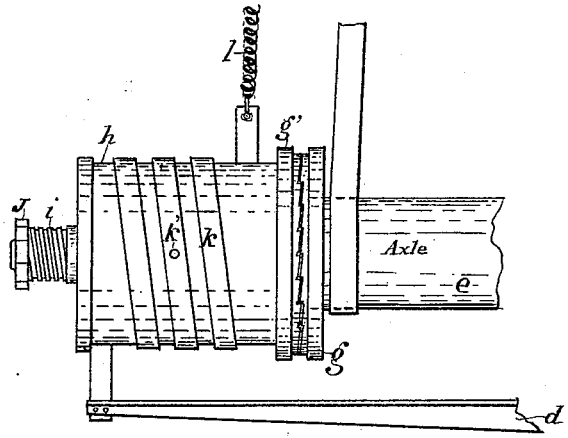

Figure 1 shows my bicycle in side elevation. Fig. 2 shows the same in plan view in position to move in a circular course. Fig. 3 shows, on an enlarged scale, one end of an axle to which is attached one of the driving-drums with its clutch mechanism and one end of a treadle and mechanism for raising the treadle, said treadle being shown at right angles to its normal position.

Like letters refer to like parts.

The object of my invention is to produce a bicycle in which the propelling force is applied to both wheels, and at the same time enabling two or more persons to ride and all apply their force to propel the machine; and in order to attain said ends I construct my new device in substantially the following manner, namely: The fore and rear wheels are connected by any suitable framing, and preferably as here shown, and so as to have in any case a back $c$ practically parallel, or nearly so, with the treadles $d$. Each of the wheels $a$ and $b$ may be made to turn to either side of the plane of the machine in the same manner as the front wheel is shown in the drawings. Each of the ends of the wheel-axles projects beyond the supports $f$, and is provided with a fixed clutch part $g$ and a loose clutch part $g'$. To the outer end of the latter is attached a drum $h$, and to the outer end of the axle and surrounding it is attached a coiled spring $i$, pressing with its outer end against a nut or washer $j$ and with its inner end on the said drum $h$, which thereby causes the two parts $g$ and $g'$ of the clutch to engage, and at the same time allow the necessary reversing motion of the said drums, which raises the treadle $d$ by allowing the teeth of the said clutch to slip over each other, said teeth being made very shallow and the inclined planes between them long, so as to move easily. Around said drums is wound a cord $k$, or like device, with any required number of turns on the drum to obtain the necessary friction so as to prevent slipping on the drum; or, if preferred, said cord may be fastened at its center directly and permanently to said drum by a suitable pin $k'$, provided a sufficient number of turns run around said drum on either side of the pin $k'$ so as to allow for the necessary motion. One end of said cord is attached to a spring $l$, which may be fastened to the leg of the standard or support $f$ by a bracket $l$, as here shown, or in any other convenient manner, so as to cause by its contraction the drum to turn and wind up the other end of the cord, carrying the treadle-bar $d$. Each of the four ends of the axles $e$ projects, and is provided with such a drum and cord and mechanism to wind it as already described, and on each side of the bicycle on the lower ends of said cord is attached a long treadle $d$, said cords and all being wound and attached so as to cause the applied force to turn both wheels in the same direction.

The operation of my improved bicycle is now plainly stated and easily understood. Each downward motion of the treadles causes the forward revolution of the drums, and thus of the wheels $a$ and $b$. When the downward stroke of the treadle is exhausted, which stroke may be long or short, at pleasure, the pressure upon it is released, and the contraction of the spring or springs $l$ now causes the released treadles, drums, and cords to move in the opposite direction, and thus bring the treadle back to its highest position, when the downward motion is repeated, and so on.

It may also be mentioned that other arrangements for operating the treadles may be employed—as, for instance, that used in what is known as the "Star" bicycle, wherein the downward force of one treadle raises the opposite one—the chief novelty in my device being the treadle-bar, which connects and drives both wheels, and in connection with it the long saddle-bar adapted to carry two or more riders.

What I claim is—

1. In a bicycle, the combination, with the axles and treadles connecting the outer ends of said axles and actuating them, of the reciprocally-turning drums attached to the ends of said axles and mechanism connecting said treadles and drums, substantially as specified.

2. In a bicycle, the combination, with the ends of the axles and treadles to connect and actuate them, of the clutched and reciprocating drums attached to the ends of said axles and mechanism to connect and actuate said axles and drums, substantially as specified.

3. In a bicycle, the combination, with the back c, axles e, springs l, and treadles d, of the reciprocating drums attached to the ends of said axles and the mechanism to connect and actuate said drums and treadles, substantially as specified.

4. In a bicycle, the combination, with the back c, forked supports f, and axles e, of the treadles d, connecting the ends of the axles, reciprocating drums k, and mechanism to connect and actuate said drums and treadles, substantially as specified.

5. In a bicycle, the combination, with the axles e, of the treadles d, clutched and longitudinally-reciprocating drums k, and mechanism to connect and actuate said drums and treadles, substantially as specified.

CHARLES L'EPLATTENIER.

Witnesses:
ANTON FOUGNER,
WM. ZIMMERMAN.